March 5, 1963 B. HOAR 3,079,800
PRESSURE MEASURING DEVICES AND SYSTEMS EMPLOYING THE SAME
Filed Jan. 22, 1959
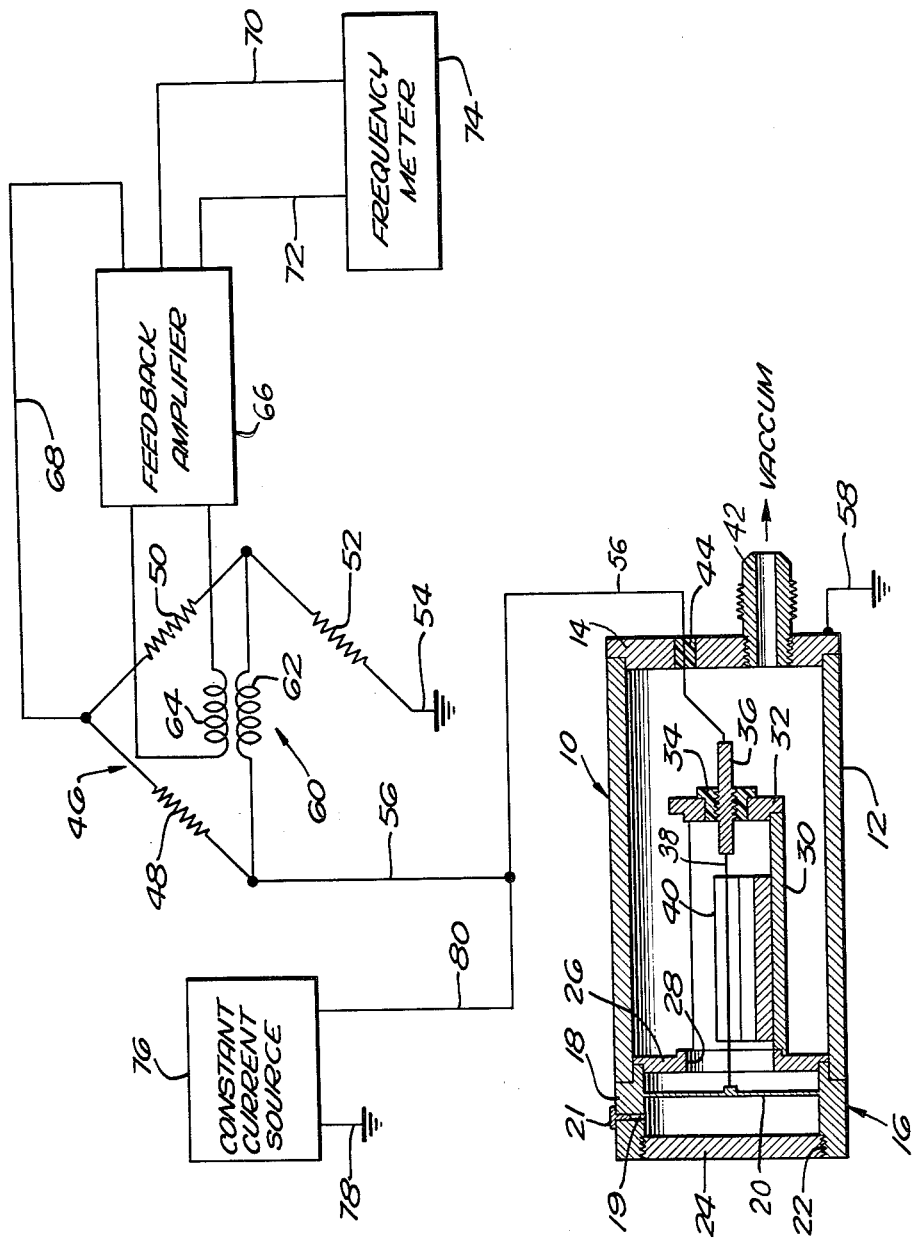
INVENTOR.
BROOKS HOAR
BY Harry C. Bierman
ATTORNEY

United States Patent Office 3,079,800
Patented Mar. 5, 1963

3,079,800
PRESSURE MEASURING DEVICES AND SYSTEMS EMPLOYING THE SAME
Brooks Hoar, Santa Ana, Calif., assignor to Borg-Warner Corporation, Chicago, Ill., a corporation of Illinois
Filed Jan. 22, 1959, Ser. No. 788,343
12 Claims. (Cl. 73—399)

This invention relates to devices and systems for measuring pressures and variations thereof, and more particularly to such devices and systems for measuring subatmospheric pressures.

Heretofore, vacuum gauges have been seriously limited as to their range of operability as evidenced by their inability to operate satisfactorily for both vacuums approaching atmospheric pressure and vacuums approaching complete or absolute evacuation. Rather, such prior devices have been operable in only one or the other of such regions due to the shortcomings of the modes of operation of such prior devices. Thus, prior vacuum gauges have been necessarily particularized for a relatively narrow operating range resulting in the necessity of using a multiplicity of gauges to cover the entire subatmospheric pressure range.

Also, the construction and mode of operation of prior art pressure gauges have been such that a gauge which was constructed for the measurement of pressures above atmospheric pressure could not be used satisfactorily for the measurement of pressures below atmospheric pressure. The converse has also been true, thus further necessitating the use of a plurality of gauges to cover the desired pressure range.

In view of this, it is an object of this invention to provide a single pressure gauge which is operable over a relatively wide range of pressure variations.

It is also an object of this invention to provide a single pressure gauge which is operable over the entire range of subatmospheric pressure variations.

Another object is to provide a device as characterized above, having variable stress means which is subjected to both a change in physical force applied thereto and a change in temperature in response to variations in pressure being sensed.

Another object is to provide a system including a device as characterized above, comprising means for measuring variations in the stress of said variable stress means as an indication of variation in pressure.

Another object is to provide such a device comprising a vibratory string one end of which is stationary and the other end of which is associated with a pressure responsive member whereby response of said member effects a change in physical force applied to said string.

Another object is to provide a device as characterized above, wherein the variable stress means or string is in circuit with a source of substantially constant electrical current such that a change in pressure to be measured varies the heat conductivity of the medium surrounding said string for corresponding variation in the stress of said string due to change in temperature thereof by virtue of current flow therethrough.

Another object of this invention is to provide a device, as described above, wherein the string is caused to vibrate within a magnetic field of constant strength and also constitutes one leg of an electrical resistance bridge which, in turn, is associated with a positive feedback amplifier whereby said string acts as a tuned electrical element to cause said amplifier to have an output frequency which corresponds to the stress of said string.

The novel features which I consider characteristic of my invention are set forth with particularity in the appended claims. The device itself, however, both as to its organization and mode of operation, together with additional objects and advantages thereof, will best be understood from the following description of a specific embodiment when read in connection with the accompanying drawing in which:

The single figure is a schematic diagram showing a pressure gauge system comprising one embodiment of the novel pressure gauge, the latter being shown in section.

Referring to the single figure of the drawing, numeral 10 designates the novel pressure or vacuum gauge comprising a cylindrically shaped metallic body or housing 12 having an end wall 14. Fixed to the other end of housing 12 is a subassembly 16 comprising a cylindrical member 18 fastened to housing 12 by any desired means, and a pressure responsive member or diaphragm 20 which is fixed within member 18 or formed integrally therewith as desired. Cylindrical member 18 is further formed with internal fastening threads 22 for receiving and retaining a hermetic sealing nut 24.

Subassembly 16 also comprises a disc-like member 26 attached to cylindrical member 18 and formed with a central opening 28. Fixed to member 26 for positioning within housing 12 is stress responsive means comprising a metallic support member 30 which may be partially cylindrical in shape and a disc-like support member 32 fixed to one end of member 30. Member 32 is formed with a central opening wherein is positioned an electrical insulating bushing 34 having a through opening provided with fastening means for receiving and retaining a metallic mounting pin 36.

A nonmagnetic electrically conductive vibratory element or string 38 is disposed within the semi-cylindrical support member 30 and has one of its ends fixed to pin 36 while its other end is fixed to diaphragm 20 to initially place said string in a state of tension. Positioned within support member 30 and affixed thereto by any well known means such as welding, brazing or soldering is a substantially U-shaped permanent magnet 40 having opposed pole faces disposed on opposite sides of vibratory string 38.

End wall 14 of housing 12 is provided with a suitably formed opening for threadably receiving connection means 42 by which gauge 10 may be connected to a source of pressure variations, as for instance, a vacuum source. Also formed in end wall 14 is an opening wherein is positioned an electrical insulating hermetic sealing member or brushing 44.

Vibratory string 38 is connected in a resistance bridge network 46 to form one leg thereof. As shown in the drawings, bridge network 46 comprises resistors 48, 50 and 52. One end of resistor 52 is grounded as at 54. String 38, by virtue of lead wire 56 which is connected to mounting pin 36 and extends through bushing 44 and by virtue of grounding of housing 12 as at 58, constitutes the fourth leg of bridge network 46.

Bridge network 46 further comprises an output transformer 60 having a primary winding 62 connected across the output terminals of network 46 and a secondary winding 64. Such secondary winding is connected to the input terminals of a feedback amplifier denoted in the drawing by block 66. A feedback circuit 68 is connected between amplifier 66 and the input of bridge network 46 at the juncture of resistors 48 and 50. The output of feedback amplifier 66 is connected by means of lead wires 70 and 72 to a frequency indicating device 74 which may take the form of a frequency meter or a frequency counter as desired.

Vibratory string 38 is also connected in circuit with a constant current supply source represented in the drawing by a block identified with numeral 76. In actual practice, it is not mandatory that source 76 have a direct current output but rather, it may have an alternating current output which has a frequency greatly removed from the frequency of vibration of string 38 as will hereinafter become apparent upon a complete understanding of the operation of the system shown in the drawing. Source 76 is grounded as at 78 and is connected in circuit with string 38 by virtue of lead wire 80 which is connected to lead wire 56.

The details of construction of feedback amplifier 66 separate and apart from the other components of the disclosed system do not form a basis for the present invention and may be determined by reference to Rieber Patent 2,689,943.

In operation, gauge 10 is connected to a source of pressure variations by means of connection means 42 and suitable tubing (not shown). If such connection is made to a source providing variations in subatmospheric pressure, it may be desirable to initially partially evacuate the cavity or chamber within cylindrical member 18 defined by diaphragm 20 and sealing plug or nut 24. To permit of this, a through opening 19 is provided in the side wall of member 18 and a sealing plug 21 is afforded for sealing off such chamber after the desired degree of evacuation is attained.

Under steady state conditions, string 38 vibrates in a direction transverse with respect to the flux flow afforded by permanent magnet 40, the frequency of such vibration corresponding to the stress or tension of said string. Since string 38 is electrically conductive, such vibration causes current to flow therethrough. Bridge network 46 is so constructed as to be tuned off the resonant frequency of string 38. Because of this an appreciable output is developed in primary winding 62 of transformer 60 whenever string 38 is vibrating at its resonant frequency. Such current flow in primary winding 62 develops a corresponding signal in secondary winding 64 of transformer 60, which signal is fed to feedback amplifier 66. Thereupon, amplifier 66 effects suitable amplification of such signal and returns a portion of the output of amplifier 66 to the input of bridge network 46. Such feedback current flows through network 46 including wire 38 thereby sustaining string 38 in vibration at its resonant frequency. This latter effect is obtained by virtue of the fact that the feedback current is of a positive characteristic with respect to the aforementioned current developed in string 38 as a result of its vibration in the magnetic field. The sustaining force for the vibration of string 38 results from the interaction of the magnetic flux afforded by permanent magnet 40 and the magnetic flux afforded by the flow of positive feedback current through said string 38.

A major portion of the output of feedback amplifier 66 is fed to the frequency readout apparatus 74 for indication of the frequency of the output signal from such amplifier. In this manner, frequency meter 74 affords a continuous indication of the frequency of vibration of string 38 and hence the stress or tension thereof. Any variation in the stress of string 38 is immediately reflected as a change in the natural frequency of vibration thereof so that the output of amplifier 66 as indicated or recorded by readout device 74 is changed accordingly.

Due to the exposure of diaphragm 20 to changes in pressure within housing 12 of gauge 10, the stress or tension of wire 38 is caused to change correspondingly. That is, if the chamber defined by housing 12 is at atmospheric pressure, diaphragm 20 will assume a given position and hence string 38 will vibrate at a given predetermined frequency in accordance with its natural mechanical resonant frequency of vibration. Under these conditions, frequency readout means 74 will afford indication of such pressure within the chamber defined by housing 12. Now assuming that the pressure within such chamber is decreased, diaphragm 20 will be caused to move such as to decrease the tension of string 38. This will cause the natural frequency of vibration of said string to decrease, and the indication afforded by readout equipment 74 will be correspondingly decreased. However, it has been discovered that although the natural frequency of mechanical vibration of string 38 varies appreciably with even small changes in pressure in the neighborhood of atmospheric pressure, as the chamber within housing 12 approaches complete evacuation diaphragm 20 becomes relatively insensitive to small changes in pressure. That is, upon a change in pressure within housing 12 from one condition of high evacuation to another condition of high evacuation, the corresponding movement of diaphragm 20 is virtually imperceptible and hence little change is effected thereby in the readout of frequency meter 74.

In order to compensate for the above explained shortcoming, the present invention contemplates continuously passing a constant current through string 38. Such flow of constant current or high frequency alternating current, as desired, in no way interferes with the above explained operation for sustaining string 38 in vibration at its natural resonant frequency.

The flow of current through string 38 generates heat therein by virtue of the electrical resistance of string 38. Now by directly exposing string 38 to the pressure variations as by positioning such string within the chamber defined by housing 12 as shown in the drawing and explained above, as the pressure within such chamber is varied the heating effect of string 38 is correspondingly effected due to the change in density of the medium surrounding string 38. That is, as the pressure within housing 12 is decreased, the density of the medium surrounding wire 38 is decreased accordingly, such decrease in density decreasing the heat conductivity of such medium and causing such wire to retain a greater portion of the heat generated therein by the constant current flow therethrough. Such increase in heating of string 38 causes the stress or tension of string 38 to change correspondingly, whereupon the frequency as read by meter 74 is likewise changed.

It has been found that the above described heating of string 38 is considerable particularly in the pressure ranges approaching complete evacuation. This is due to the fact that within such ranges the density of the medium in the chamber defined by housing 12 is already quite low and any change in such density effects an appreciable percentage change therein and hence an appreciable change in the heat conductivity thereof.

It has been found that the current from source 76 may be permitted to flow in string 38 throughout all variations in pressure within housing 12 without creating any detrimental effects on the frequency of vibration response of the wire. Rather, it merely becomes a matter of properly calibrating the entire system so that the indications afforded by meter 74 are correlated to predetermined pressures within housing 12.

In view of the foregoing, it is seen that the present invention provides a pressure indicating device which is applicable for any and all ranges or pressure variations, and particularly for the entire subatmospheric pressure range.

Although I have shown and described certain specific embodiments of my invention, I am fully aware that many modifications thereof are possible. My invention, therefore, is not to be restricted except insofar as is necessitated by the prior art and by the spirit of the appended claims.

What I claim is:

1. In a substantially full range vacuum gauge, the combination comprising, means affording a sealed chamber for pressure variations therewithin, a pressure element tending to move in response to said pressure variations, variable stress means exposed to said pressure variations within said chamber and movable by said pressure element for variation in the stress of said variable stress means with response of said element, means applying heat to said stress means at a substantially constant rate for variation in the stress thereof with changes in heat conductivity thereabout as caused by such pressure variations, whereby the stress of said variable stress means is caused to vary appreciably throughout substantially the entire subatmospheric pressure range, and means for indicating the level of vacuum measured by the gauge.

2. In a substantially full range vacuum gauge, the combination comprising, means affording a sealed chamber for pressure variations therewithin, a pressure element tending to move in response to said pressure variations, vibratory variable stress means for vibration in accordance with its stress, said stress means being exposed to said pressure variations within said chamber and movable by said pressure element for variation in the stress of said variable stress means with response of said element, means applying heat to said stress means at a substantially constant rate for variation in the stress thereof with changes in heat conductivity thereabout as caused by such pressure variations, whereby the vibration of said variable stress means is caused to vary appreciably throughout substantially the entire subatmospheric pressure range, and means for indicating the level of vacuum measured by the gauge.

3. In a substantially full range vacuum gauge, the combination comprising, means affording a sealed chamber for pressure variations therewithin, a pressure responsive diaphragm exposed to said pressure variations, a vibratory string the vibration frequency of which varies with changes in stress thereof, said string being exposed to said pressure variations within said chamber and movable by said diaphragm for variation in the stress of said string with response of said diaphragm, means applying heat to said string at a substantially constant rate for variation in the stress thereof with changes in heat conductivity thereabout as caused by such pressure variations, whereby the vibration frequency of said string is caused to vary appreciably throughout substantially the entire subatmospheric pressure range, and means for indicating the level of vacuum measured by the gauge.

4. In a substantially full range vacuum gauge the combination comprising, means affording a sealed chamber for pressure variations therewithin, a pressure element tending to move in response to said pressure variations, an electrically conductive prestressed vibratory string exposed to said pressure variations within said chamber and movable by said pressure element for variation in its stress with reponse of said element, means for sustaining said string in vibration in accordance with its stress, means applying heat to said string at a substantially constant rate for variation in the stress thereof with changes in heat conductivity thereabout as caused by such pressure variations, whereby the vibration frequency of said string is caused to vary appreciably in response to pressure variations within said chamber throughout substantially the entire subatmospheric pressure range, and means for indicating the level of vacuum measured by the gauge.

5. In a pressure gauge, the combination comprising, means affording a sealed chamber for pressure variations therewithin, a pressure element tending to move in response to said pressure variations, an electrically conductive prestressed vibratory string exposed to said pressure variations within said chamber and movable by said pressure element for variation in its stress with response of said element, means including said string as a tuned electrical element for sustaining said string in vibration in accordance with its stress, means applying heat to said string at a substantially constant rate for variation in the stress thereof with changes in heat conductivity thereabout as caused by such pressure variations, whereby the vibration of said string is caused to vary appreciably in response to pressure variations within said chamber, and means for indicating the level of pressure measured by the gauge.

6. In a substantially full range vacuum gauge, the combination comprising, means affording a sealed chamber for pressure variations therewithin, a pressure element tending to move in response to said pressure variations, variable stress means exposed to said pressure variations within said chamber and movable by said pressure element for variation in the stress of said variable stress means with response of said element, means applying heat to said stress means at a substantially constant rate for variation in the stress thereof with changes in heat conductivity thereabout as caused by such pressure variations, and means for determining variations in stress of said variable stress means as an indication of pressure variations within said chamber throughout substantially the entire subatmospheric pressure range.

7. In a substantially full range vacuum gauge, the combination comprising, means affording a sealed chamber for pressure variations therewithin, a pressure element tending to move in response to said pressure variations, a nonmagnetic electrically conductive vibratory string exposed to said pressure variations within said chamber and movable by said pressure element for variation in the stress of said string with response of said element, means affording magnetic flux flow transverse of said string, means in circuit with said string to receive the output thereof due to vibration of said string in said magnetic flux and to feedback a portion of such output to said string to sustain the same in vibration at a frequency corresponding to its stress, means applying heat to said string at a substantially constant rate for variation in the stress thereof with changes in heat conductivity thereabout as caused by such pressure variations, and means for determining variations in the frequency of vibration of said string as an indication of pressure variations within said chamber throughout the entire subatmospheric pressure range.

8. In a substantially full range vacuum gauge, the combination comprising, means affording a sealed chamber for pressure variations therewithin, a pressure responsive diaphragm tending to move in response to said pressure variations, a nonmagnetic electrically conductive vibratory string exposed to said pressure variations within said chamber and movable by said pressure element for variation in the stress of said string with response of said element, means affording magnetic flux flow transverse of said string, means in circuit with said string to receive the output thereof due to vibration of said string in said magnetic flux and to feedback a portion of such output to said string to sustain the same in vibration at a frequency corresponding to its stress, means applying heat to said string at a substantially constant rate for variation in the stress thereof with changes in heat conductivity thereabout as caused by such pressure variations, and means for determining variations in the frequency of vibration of said string as an indication of pressure variations within said chamber throughout the entire subatmospheric pressure range.

9. In a substantially full range vacuum gauge, the combination comprising, means affording a sealed chamber for pressure variations therewithin, a pressure element tending to move in response to said pressure variations, electrically conductive variable stress means exposed to the pressure variations within said chamber and movable by said pressure element for variation in the stress of said variable stress means in accordance with response to said element, constant current means in circuit with said variable stress means to effect heating thereof in accordance with changes in heat conductivity thereabout as caused by such pressure variations, whereby the stress of said variable stress means is caused to vary appreciably throughout substantially the entire subatmospheric pressure range, and means for indicating the level of vacuum measured by the gauge.

10. In a substantially full range vacuum gauge, the combination comprising, means affording a sealed chamber for pressure variations therewithin, a pressure element tending to move in response to said pressure variations, variable stress means exposed to said pressure variations within said chamber and movable by said pressure element for variation in the stress of said variable stress means with response of said element, means applying heat to said stress means at a substantially constant rate for variation in the stress thereof with changes in heat conductivity thereabout as caused by such pressure variations, the stress of said variable stress means thereby being a function of both the pressure applied to said element and the change in temperature of said stress means, whereby the stress of said stress means is caused to vary appreciably in response to any and all pressure variations throughout the entire subatmospheric pressure range and means for indicating the level of vacuum measured by the gauge.

11. In a pressure gauge, the combination comprising, means affording a sealed chamber for pressure variations therewithin, a pressure element tending to move in response to said pressure variations, variable stress means movable by said pressure element for variation in the stress of said variable stress means with response of said element, means causing the temperature of said stress means to vary in accordance with said pressure variations comprising means for applying heat to said stress means at a substantially constant rate, and means for determining variations in stress of said variable stress means due to both variation in pressure on said pressure element and variation in temperature of said stress means as an indication of pressure variations within said chamber.

12. In a pressure gauge, the combination comprising, means affording a sealed chamber for pressure variations therewithin, a pressure element tending to move in response to said pressure variations, variable stress means movable in response to movements of said pressure element for variation in the stress of said variable stress means with response of said element, means causing the temperature of said stress means to vary in accordance with said pressure variations comprising means for applying heat to said stress means at a substantially constant rate, whereby the stress of said variable stress means is a function of both the pressure applied to said element and the temperature of said stress means and means for indicating the level of pressure measured by the gauge.

References Cited in the file of this patent

UNITED STATES PATENTS

| | | |
|---|---|---|
| 2,447,817 | Rieber | Aug. 24, 1948 |
| 2,604,787 | Coyne et al. | July 29, 1952 |
| 2,712,239 | Havens | July 5, 1955 |
| 2,750,796 | Knoll et al. | June 19, 1956 |